(12) United States Patent
Kollar et al.

(10) Patent No.: US 8,572,895 B2
(45) Date of Patent: Nov. 5, 2013

(54) RECEIVER/EMITTER COVER UTILIZING ACTIVE MATERIAL ACTUATION

(75) Inventors: Craig A. Kollar, Sterling Heights, MI (US); Xiujie Gao, Troy, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/181,465

(22) Filed: Jul. 29, 2008

(65) Prior Publication Data

US 2010/0027119 A1    Feb. 4, 2010

(51) Int. Cl.
*H04N 7/18*    (2006.01)

(52) U.S. Cl.
USPC ............................................ 49/360; 348/148

(58) Field of Classification Search
USPC ............... 49/324, 347, 352, 404, 413–414, 1, 49/360; 348/82–85, 118–120, 151, 148; 296/97.1–97.11, 152
See application file for complete search history.

(56) References Cited

U.S. PATENT DOCUMENTS

| | | | | |
|---|---|---|---|---|
| 4,277,804 A * | 7/1981 | Robison | ........................ | 348/148 |
| 4,432,609 A * | 2/1984 | Dueker et al. | ................ | 359/236 |
| 4,664,493 A | 5/1987 | Takagi | | |
| 4,747,887 A * | 5/1988 | Honma | ........................ | 148/503 |
| 4,806,815 A * | 2/1989 | Honma | ........................ | 310/307 |
| 4,817,125 A | 3/1989 | Sklebitz | | |
| 4,977,575 A | 12/1990 | Ortiz | | |
| 5,150,702 A | 9/1992 | Miyanaga et al. | | |
| 5,307,725 A * | 5/1994 | Desmond et al. | ............ | 89/36.14 |
| 5,459,544 A | 10/1995 | Emura | | |
| 5,463,384 A * | 10/1995 | Juds | ............................... | 340/903 |
| 5,533,778 A * | 7/1996 | Sheridan | ........................ | 296/152 |
| 6,048,109 A * | 4/2000 | Kikuchi | ......................... | 396/439 |
| 6,819,231 B2 * | 11/2004 | Berberich et al. | ............ | 340/435 |
| 6,912,007 B2 * | 6/2005 | Gin | ................................. | 348/373 |
| 6,945,045 B2 * | 9/2005 | Hara et al. | ....................... | 60/527 |
| 7,380,843 B2 * | 6/2008 | Alacqua et al. | ................ | 292/163 |
| 7,505,198 B2 * | 3/2009 | Sander | ........................... | 359/368 |
| 7,625,019 B2 * | 12/2009 | Alacqua et al. | ................ | 292/137 |
| 2001/0025477 A1 * | 10/2001 | Hara et al. | .................... | 60/39.02 |
| 2009/0277595 A1 * | 11/2009 | Gao et al. | .................. | 160/370.21 |

FOREIGN PATENT DOCUMENTS

| | | | |
|---|---|---|---|
| DE | 102005021672 A1 | * | 11/2006 |
| EP | 1726467 A1 | * | 11/2006 |
| JP | 2004309964 A | * | 11/2004 |
| JP | 2007057581 A | * | 3/2007 |
| WO | WO 2004088068 A1 | * | 10/2004 |

* cited by examiner

*Primary Examiner* — Mark Consilvio (57) ABSTRACT

A system for protecting an emitter/receiver device, including a cover and an active material actuator operable to selectively cause the cover to move between default protective and open positions, wherein the actuator includes at least one active material element, such as an SMA wire configured to cause the retraction of the cover and present a heating net when activated, and an activation signal source, and preferably further including at least one pulley and/or jack mechanism configured to redirect a displacement force vector, synchronization means, an antagonistic element for biasing the cover towards the protective or open position, and a controller presenting overheating protection through control logic.

7 Claims, 6 Drawing Sheets

RECEIVER/EMITTER COVER UTILIZING ACTIVE MATERIAL ACTUATION

BACKGROUND

1. Field of the Invention

The present disclosure relates to protective covers, and more particularly, to a system including a cover adapted to protect the engaging surface of a receiver or emitter, and having an active material actuator drivenly coupled to the cover.

2. Discussion of Prior Art

Receivers and Emitters, such as object detection devices, utilize covers to protect their engaging surfaces (i.e., a surface directed towards the target, object, or condition, through which the device typically operates, such as the lens of a camera) from direct exposure to undesirables and/or damaging conditions. For example, cameras, whether stand alone or housed within a carrier, such as a vehicle, typical include a shutter operable to protect the lens from scratching when not in use. Methods of deploying these covers have likewise been developed to facilitate protection and increase effectiveness.

Various concerns relating to conventional covers, however, remain in the art. In automotive settings, for example, covers are typically opened electro-mechanically, thereby requiring the use of a motor. It is appreciated that the motors involved therewith increase the weight, volume, cost, noise production, and likelihood of failure of the system. Where ice, snow, wax or dirt accumulation is encountered, for example, conventional covers may be precluded from opening or may otherwise become dysfunctional. As a result, the critical function performed by the object detection device may be prevented.

BRIEF SUMMARY

Plural embodiments of a system adapted to protect a receiver/emitter surface from a space are disclosed. The system generally includes a moveable cover configured to overlay, so as to form superjacent layers with a surface or window in a protective position, wherein the surface defines a first area, and the cover preferably defines a second surface area. An actuator including an active material element operable to undergo a change when activated is drivenly coupled to the cover, such that the cover is caused to move from the protective and to an open position as a result of the change, or vice versa The system addresses the afore-described concerns of conventional systems and methods. Among other things, the system is useful for selectively deploying to protect the device from undesirables and/or damaging conditions, such as water, ice and debris, and selectively retracting so as to allow the operation of the device.

The system provides an automatic modus for manipulating the cover that does not require an electromechanical, electro-magnetic, or electrohydraulic motor. More particularly, the invention utilizes the change experienced by active (or "smart") materials, when exposed to an activation signal, to effect retraction of the cover. As such, in comparison to traditional actuators, the invention reduces equivalent component size, weight, and improves robustness, design capabilities, packaging flexibility, and silent operation (both acoustically and with respect to electromagnetic field radiation).

Finally, by taking advantage of the inherent function of active materials, the invention is further useful for providing a retractable cover that is operable under a greater variety of environments. Where shape memory alloy material is used, for example, the actuator offers snow/ice melting capabilities as a by-product of thermal activation.

Thus, it is understood and appreciated that the present invention provides a number of advantages over conventional manually, electro-mechanically, magnetically, and hydraulically driven prior art systems. Further aspects of the invention including utilizing synchronization means, SMA wire actuation, an active-material spooled actuator, pulley and wire configurations, and antagonistic elements are presented herein. The above described and other features are exemplified by the following figures and detailed description.

BRIEF DESCRIPTION OF THE DRAWINGS

Preferred embodiments of the invention are described in detail below with reference to the attached drawing figures, wherein.

DETAILED DESCRIPTION

Figure 1:
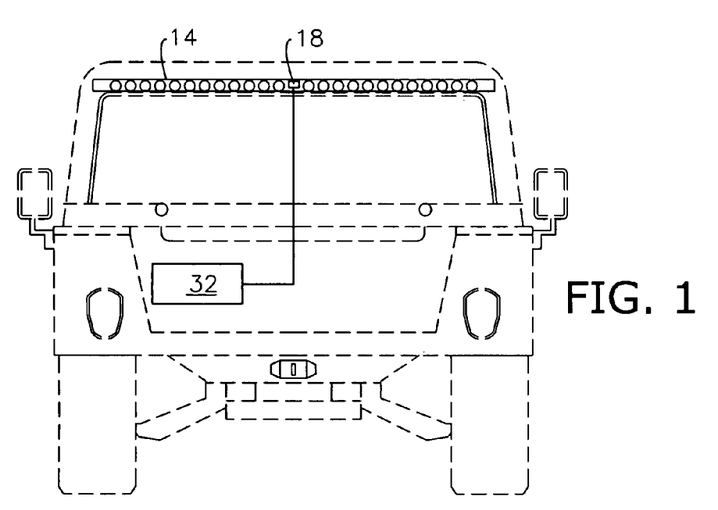
FIG. 1 is a rear elevation view of a vehicle having a center-high-mounted-stop-lamp (CHMSL) and a rear object detection device located therein.
Figure 2:
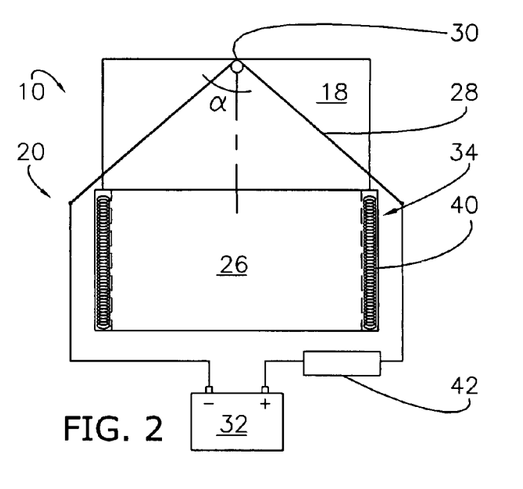
FIG. 2 is a front elevation view of a cover in a protective position relative to a window, and an active material actuator consisting of a single SMA wire, in accordance with a preferred embodiment of the invention.

The present invention concerns a system 10 operable to selectively protect an emitter/receiver device 12, such as an object detection camera adapted for use within the center-high-mounted-stop lamp (CHMSL) 14 of a vehicle 16 (FIGS. 1 and 2). The system 10 includes an openable cover 18, and an active-material based actuator 20 drivenly coupled to the cover 18. Although described herein with respect to a vehicle 16, such as an automobile, truck, SUV, boat, airplane, etc., it is appreciated that the benefits of the present invention can be utilized in other emitter/receiver device settings wherein utilizing active material to open or close a cover more efficiently and reliably is desired. As such, the term "cover" is not limited to the embodiments illustrated herein, and shall include, for example, shutters, screens, hoods, projections, monitors, and filters.

Turning to the configuration of the present invention, the cover 18 is disposed near an engaging surface 22a (e.g., a camera lens, fixed cover, etc.) or a window 22b formed by the vehicle or other housing 16 (FIGS. 2-11a) that provides access to the device 12. The surface 22a and/or window 22b presents a sufficient cross-sectional area to allow a signal, such as a radar beam, to be transmitted, or radiation, such as light, to be received by the device 12. In the illustrated embodiment, the window 22b is rectangularly depicted defining top, bottom, and lateral edges; however, it is certainly appreciated that other window and cover configurations could be utilized with the various embodiments of the invention. For example, the window 22b and/or cover 18 may be circular, hexagonal, etc.

Figure 9:
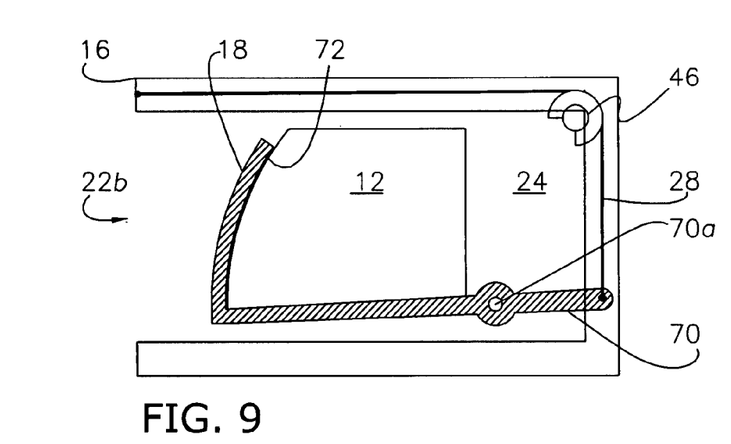
FIG. 9 is a side elevation view of a camera, camera housing, cover overlaying a surface, a lever arm connected to the cover and defining a pivot point, and an active material actuator including at least one pulley and associative SMA wire interconnecting the arm and the housing, in accordance with a preferred embodiment of the invention.

The cover 18 is configured to block interaction between the surface 22a and undesirables, such as foreign objects, abrasive particulate matter, mud, ice, snow, and other damaging conditions, as it is appreciated that such interaction may render the device 12 inoperative or less effective. For example, where the device 12 is a camera, the cover 18 is operable to prevent contact with particulate matters, so that scratches are not formed upon the lens surface 22a. The cover 18 may directly overlay the surface 22a as shown in FIGS. 9-10a; or more preferably where a window 22b to an interior compartment 24 is defined by the housing 16, the cover 18 may function to overlay the window 22b, so as to prevent the conditions from infiltrating into the compartment 24.

The cover 18 and actuator 20 are cooperatively configured to selectively move the cover 18 between protective and open positions (FIG. 2). The preferred cover 18 is generally rigid, impervious to anticipated conditions, and formed of suitable material able to withstand repeated exposure thereto. Alternatively, and as further described herein, the cover 18 may be at least temporarily pliable and/or flexible, so as to facilitate retraction within a space 26 that requires the cover 18 to achieve a different configuration (FIGS. 10 and 10a). Further, the cover 18 may present a screen or scroll that winds during retraction but presents a generally planar configuration in the protective position.

The inventive system 10 employs the reversible shape, stiffness, and/or shear strength change capabilities of an active (or "smart") material to move the cover 12, and as such, preferably utilizes a relatively large displacement active material. As used herein the term "active material" (AM) is to be given its ordinary meaning as understood and appreciated by those of ordinary skill in the art; and thus includes, but is not limited to, any material or composite that undergoes a reversible fundamental (e.g., intensive physical, chemical, etc.) property change when activated by an external stimulus or signal. The term "active-material based actuator" shall mean an actuator whose primary function is driven by a change in at least one active material.

As shown in the plural embodiments, the active-material based actuator 20 is in driven communication with and operable to cause the in-plane translation (FIGS. 2-7a), in-plane rotation (FIGS. 8 and 8a), or out-of-plane rotation (FIGS. 9-11a) of the cover 18. It is appreciated that the inventive system 10 and modes of operation disclosed herein are employable by select active-material actuators, including those exemplary embodiments described and illustrated herein. However, it is appreciated and understood that other equivalent configurations and forms of active-material actuation may be used.

Suitable active materials for use with the actuator 20 include, without limitation, shape memory alloys, shape memory polymers, electroactive polymers (EAP), piezoelectric materials (both unimorphic and bimorphic), magnetostrictive materials, and electrostrictive materials. With respect to the illustrated embodiments, the actuator 20 more preferably includes a heat responsive active material (AM) element 28, such as a shape memory alloy (SMA), shape memory ceramic (SMC), or thermoresponsive shape memory polymer (SMP) wire, wherein the term "wire" is meant to encompass a range of geometric forms such as strands, braids, strips, bands, cables, sheets, slabs, springs, etc.

The cover 18 may be opened directly by the change in the element 28; or indirectly, through further actuator components designed to release stored energy (not shown). Once activated, the actuator 20 may be configured such that maintaining the change in the element 28 retains the cover 18 in either a partially or fully opened position. Alternatively, a locking mechanism (also not shown), such as a latch, detent, or locking pin (not shown), may be triggered to hold the cover 18 in the protective or open position, while the element 28 changes or reverses its change. The locking mechanism is then released to enable the cover 18 to return to the open or protective position.

In a preferred embodiment, the cover 18 is automatically returned after being opened for a predetermined period or the occurrence of an event (e.g., shifting the vehicle from reverse, etc.), by the reversing action of the active material element 28. Thus, the system 10 may further include a timer and/or at least one sensor (not shown) operable to detect the event and communicatively coupled to the actuator 20.

Preferred configurations of the system 10 and methods of using the same are more particularly described below, so as to further exemplify the teachings of the present invention:

I. Exemplary In-plane Translation Configurations

Figure 2A:
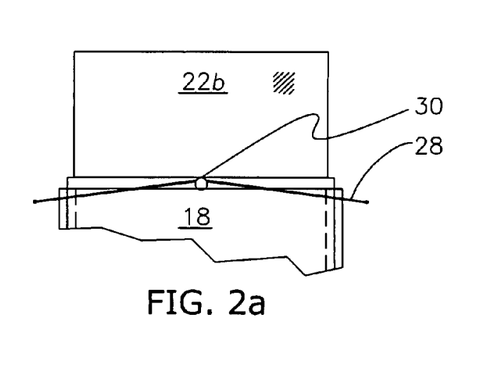
FIG. 2a is a front elevation view of the cover in an open position relative to the window and the actuator shown in FIG. 2.

In the simple leveraging embodiment shown in FIGS. 2 and 2a, the actuator 20 consists of and the element 28 is presented by an elongated SMA wire element. The wire 28 presents sufficient tensile strength and linear displacement, when activated, to cause the cover 18 to translate a desirable distance, and as such, enable the normal functioning of the emitter/receiver. In this configuration, the wire 28 is connected to the housing 16 and entrains the cover 18, so as to directly cause an in-plane linear translation distance preferably not less than the height of the window 22b (FIG. 2a).

More particularly, the wire 28 is anchored to the housing 16 beneath the base of the window 22b and equally spaced from the lower corners (FIG. 2). The wire 28 passes over a fixed engaging prong 30 defined by the cover 18 along its lateral centerline and more preferably at or near the top, and is tightly secured relative thereto. This equates and maximizes the length of the mirrored hypotenuses formed by the wire 28. In this configuration, and as a result of the opposite side or horizontal dimension being fixed, it is appreciated that the linear displacement of the wire 28 will result in a greater displacement of the cover 18 in the vertical direction that is proportional to the cosine of the angle, $\alpha$, defined by the hypotenuse and centerline (FIG. 2). However, it is also appreciated that the vertically applied force to move the cover 18 is decreased proportionately.

The SMA wire 28 is thermally coupled to an activation signal source 32, such as the charging system of the vehicle 16 (FIGS. 1 and 2), which provides indirect heating by causing a current to flow through the resistance of the wire 28. To activate the actuator 20, the wire 28 is heated from a first and to a second temperature by the source 32. At the second temperature the wire 28 is caused to undergo the change in fundamental property. For example, the second temperature may be the austenite finish temperature of the material, which causes a re-organization of the crystal structure of the wire and results in a contraction of the wire length. When the wire 28 has cooled to a third temperature less than the second and undergoes a reversal of the change, the cover 12 is preferably caused to return to the default position. Thus, the third temperature may represent the martensite finish temperature of the wire 28.

Figure 3:
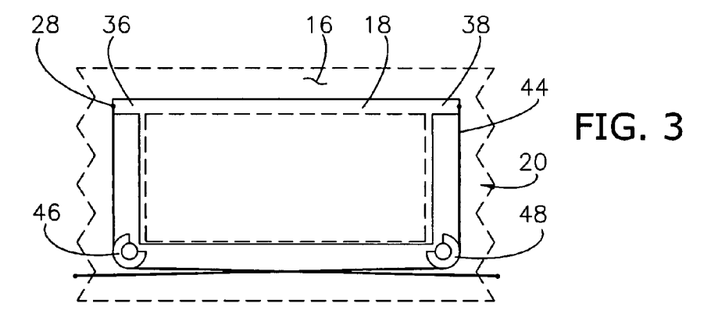
FIG. 3 is a front elevation view of a cover overlaying a window and an active material actuator, including first and second SMA wires and pulleys, in accordance with a preferred embodiment of the invention.
Figure 3A:
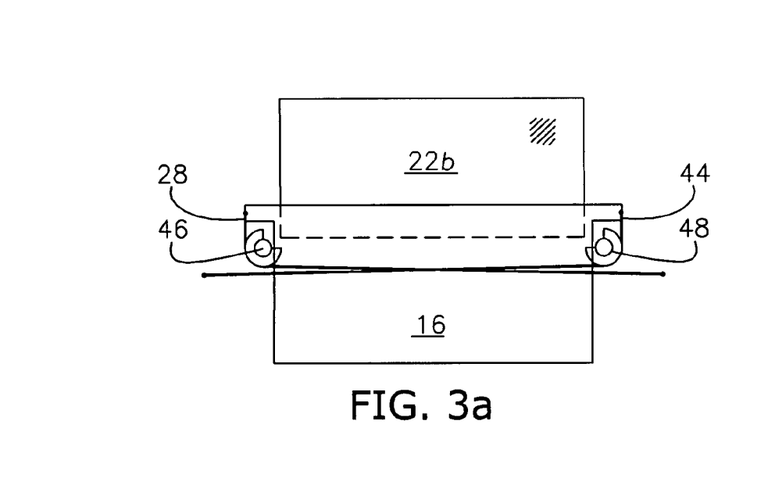
FIG. 3a is a front elevation view of the cover in an open position relative to the window and the actuator shown in FIG. 3.

In another aspect of the invention, the system 10 preferably includes guide and/or synchronization means operable to ensure that the cover 18 linearly translates without rotation, as would be generated, for example, by the unequal heating of the hypotenuses defined in FIG. 2. To that end, and as shown in FIG. 2, the housing 16 preferably defines first and second slots 34 within which the cover 18 is tightly received and translates. The slots 34 prevent rotation by the cover 18, irrespective to unequal heating of the wire 28. More preferably, and as shown in the illustrated embodiments, the cover 18 preferably defines left and right anchors 36,38, adjacent the top and lateral edges, that travel within the slots 34 (FIGS. 3 and 3a).

The preferred actuator 20 further includes an antagonistic element 40 that encourages the cover 18 to return to the default protective position, and preferably presents a biasing force in that direction. For example, the antagonistic element 40 may include a second SMA wire that is activated once being open is no longer desired, or at least one conventional compression spring configured to engage the cover 18 and oppose the retracting wire 28 (FIG. 2). The element 40 is preferably configured so as not to obstruct the surface 22a or window 22b when the cover is opened. As such, two identical springs 40 may reside and be compressed within the slots 34 (FIG. 2). Alternatively, at least one tension spring 40 may intermediately couple the cover 18 and housing 16, so as to be stretched by the cover 18 in the open position. Once the wire 28 is cooled, the springs 38 are able to release their stored energy thereby assisting the cover 18 to return to the protective position.

In yet another aspect of the invention, it is appreciated that the SMA wire 28 where a sufficient footprint is provided, generates a heating net during activation. In FIG. 2, the diagonal orientation of the wire 28 within the perimeter of the cover 18 provides such a footprint. The net can be utilized to cure inoperable conditions, thereby expanding the number of environments within which the system 10 is functional. For example, the heat generated during the activation of the wire configuration shown in FIG. 2 may be used to melt accumulated ice during winter months, as necessary.

To facilitate this function, the actuator 20 and source 32 are preferably coupled to an intermediate controller 42 (FIG. 2). The controller 42 is programmably configured to regulate the signal input to, so as not to over-load, the wire 28 with heat generated stress. Where ice accumulation prevents retraction upon first attempt, for example, control logic may be configured to discontinuously deliver the activation signal, or to modify the signal, (e.g., produce a lower amplitude), so that heat energy is generated over a period sufficient to melt the ice, but the peak temperature is limited, so as not to overheat the wire 28. Simple control logic is preferably implemented to effect overload protection through software modification of an existing control system; however, mechanical switching may also be used.

In another embodiment shown in FIGS. 3 and 3a, the actuator 20 further includes a second SMA wire element 44, and first and second pulleys 46,48. The pulleys 46,48 are rotatably connected to the housing 16 beneath the base of the window 22b and preferably near the lower-most corners. Each of the wires 28,44 is entrained by one of the pulleys 46,48, connected to the cover 18 preferably along the top edge (e.g., at one of the anchors 36,38), and to a fixed point of the housing 16 at the other end. More particularly, and as illustrated, the actuator 20 is configured so that connection portions of the wires 28,44 extend vertically to engage, so as to impart a vertical displacement force upon the cover 18. The wires 28,44 then generally run horizontally before connecting to the housing 16. Thus, in this configuration, the pulleys 46,48 function to change the direction of the force vector. It is appreciated that the wire may extend much farther then suggested by FIGS. 3 and 3a, as is needed to provide the necessary displacement. Finally, and advantageously, it is appreciated that, in this configuration, the SMA wires 28,44 provide focused heating at the circumference of the window 22b, so as to melt, for example, ice accumulation in the cracks, which may prevent retraction. As previously described, control logic is preferably provided herein to prevent overheating.

Figure 3B:
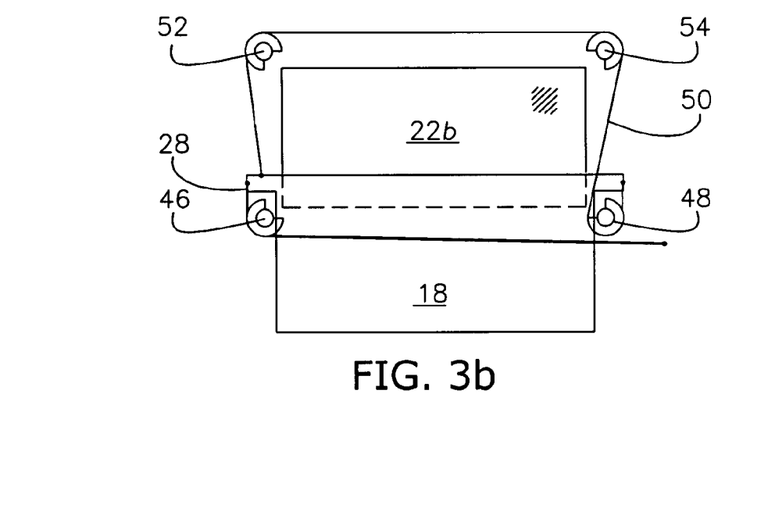
FIG. 3b is a front elevation view of the cover and actuator shown in FIG. 3, wherein the second wire is replaced by a fixed length cable and third and fourth pulleys to provide synchronous motion.

Alternatively, in order to ensure synchronous motion, the second wire 44 may be replaced by a fixed length cable 50. The cable 50 is further entrained by third and fourth pulleys 52,54 rotatably connected to the housing 16. Here, the actuator 20 is configured such that when the first SMA wire 28 pulls the left anchor 36 downward, the cable 50 is caused to congruently pull the right anchor 38 downward, as shown in FIG. 3b.

Figure 4:
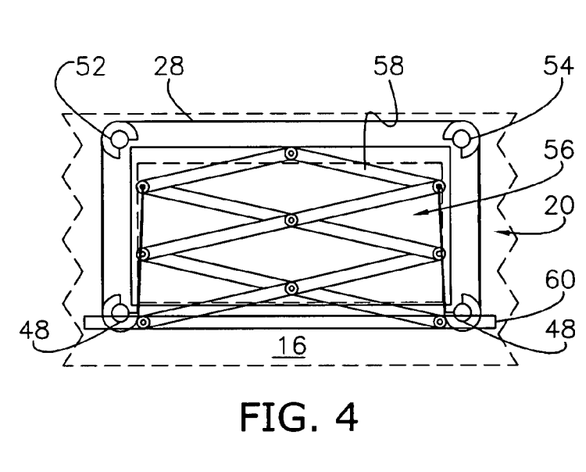
FIG. 4 is a front elevation view of a cover overlaying a window and an active material actuator including a jack mechanism, plurality of pulleys, a single SMA wire, and a horizontal guide slot, in accordance with a preferred embodiment of the invention.
Figure 4A:
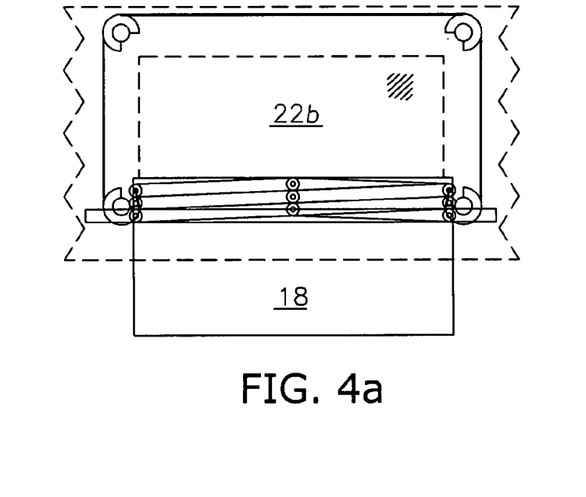
FIG. 4a is a front elevation view of the cover in an open position relative to the window, and the actuator shown in FIG. 4.

In another embodiment shown in FIGS. 4 and 4a, the actuator 20 includes a jack mechanism 56 comprising a plurality of interconnected scissor members 58. Each pair of members 58 are rotatably interconnected at their mid-points and further connected to the adjacent pairs at their distal points, through pin connections; except that the top pair is fixedly connected to the cover 18 at the top, and the bottom pair has pins or rollers able to rolling engage the horizontal slot 60 defined by the housing 16. Similar to vertical slots 34, it is appreciated that horizontal slot 60 prevents cover rotation. The mechanism 56, thereby presents a collapsible structure, as is known in the art.

In this configuration, a preferred embodiment of the actuator 20 shown in FIGS. 4 and 4a, consists of an SMA wire 28 and four pulleys 46,48,52,54. The pulleys 46,48,52,54 are rotatably connected to the housing 16 near the four corners of the window 22b and entrain the wire 28. The wire 28 connects to the mechanism 56 preferably at the uppermost set of members 58, so as to maximize length and therefore available displacement. As shown in FIG. 4, the actuator 20 is preferably configured such that the wire 28 is generally vertical at the connecting portion, so as to maximize the applied force generated by the activation of the wire 28. Alternatively, the wire 28 may be connected to the bottom members 58. In the later configuration, it is appreciated that the length of the two bottom members can be adjusted such that the needed displacement and the length of the SMA wire 28 maintains a ratio that meets the required fatigue life. Finally, it is also appreciated that the wire 28 may be arranged horizontally or in other configurations.

Figure 5:
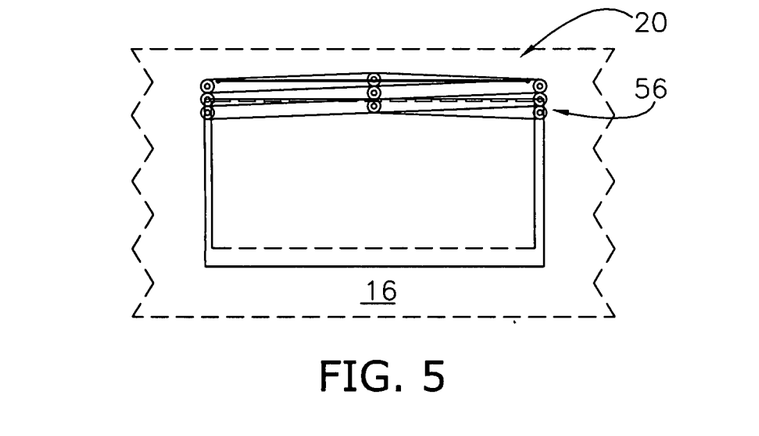
FIG. 5 is a front elevation view of a cover overlaying a window and an active material actuator including a jack mechanism, and a single SMA wire horizontally interconnecting two upper mechanism members, in accordance with a preferred embodiment of the invention.
Figure 5A:
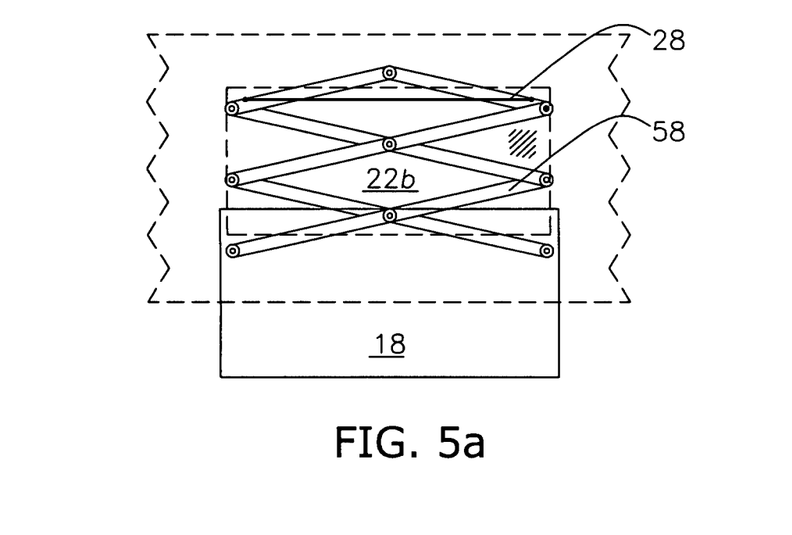
FIG. 5a is a front elevation view of the cover in an open position relative to the window, and the actuator shown in FIG. 5.

FIGS. 5 and 5a show an alternative jack mechanism embodiment, wherein the actuator 20 consists of an SMA wire 28. The wire 28 horizontally interconnects a pair of members 58 preferably at their laterally distal ends so as to maximize wire length and displacement. In FIG. 5a, the wire 28 interconnects an upper pair and has been activated, causing it to shorten and the mechanism 56 to longitudinally expand. In this configuration, the mechanism 56 is connected to the housing 16 above the window 22b and the cover 18 is attached to the lowermost member pair, so that the cover 18 is caused to travel downward when the mechanism 56 expands. As a result, it is appreciated that the mechanism 56 obstructs the window 22b in the open position (FIG. 5a), and is therefore preferably formed of material transparent to the functioning beam, radiation or otherwise signal transmitted or received by the device 12.

In this embodiment, it is appreciated that the area heated by the SMA wire will be limited, and as such, additional heating elements may be used to thaw snow/ice. For example, regular heating wires (not shown) may be placed on other members 58 and in series with the SMA wire 28 so that heating of the whole cover 18 can be achieved.

Figure 6:
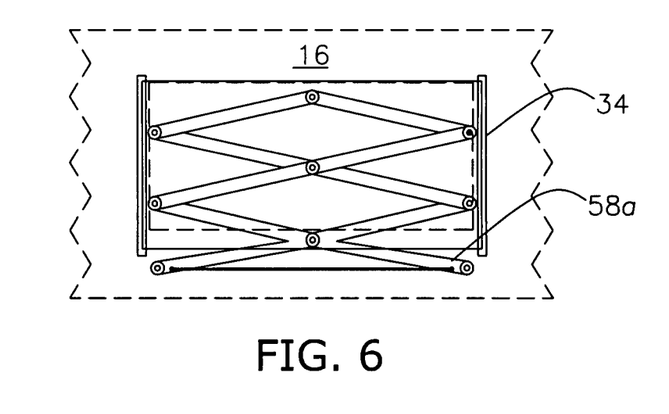
FIG. 6 is a front elevation view of a cover overlaying a window and an active material actuator including a jack mechanism, a single SMA wire horizontally interconnecting the two lower-most mechanism members, and two vertical guide slots, in accordance with a preferred embodiment of the invention.
Figure 6A:
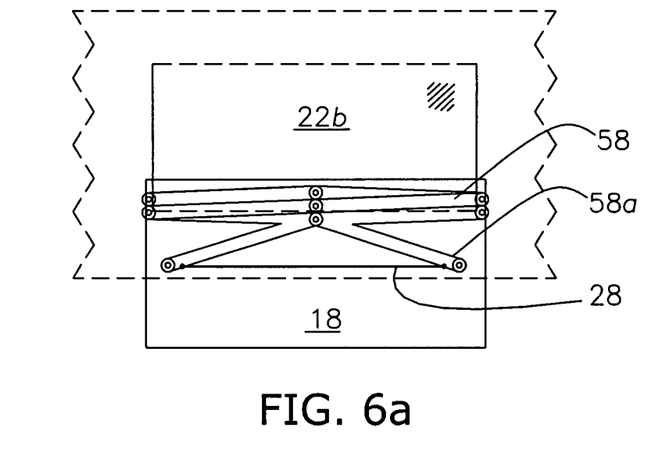
FIG. 6a is a front elevation view of the cover in an open position relative to the window, and the actuator shown in FIG. 6.

Alternatively, the wire 28 may interconnect modified lowermost members 58a, each presenting a "V"-shaped configuration (FIGS. 6 and 6a). The members 58a are pivotably interconnected at, so as to be rotated about, their vertices. As shown, the wire 28 is connected to the members 58a at their lowermost distal ends, and configured to cause their downward rotation, when activated. When rotated downward the members 58a, in turn, cause the mechanism 56 to collapse as shown in FIG. 6a. The cover 18 is preferably attached to the uppermost mechanism point so as to maximize displacement. The mechanism 56 is attached to the housing 16 at the vertices of members 58a, so that the mechanism 56 does not obstruct the window 22b in the open position. Again, to prevent rotation of the cover 18, slots 34 may be provided to ensure a single-degree of freedom.

Figure 7:
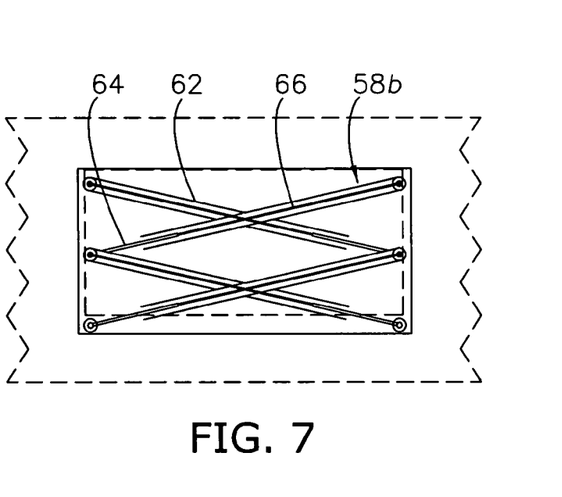
FIG. 7 is a front elevation view of a cover overlaying a window, and an active material actuator including a jack mechanism formed of multiple members comprised of a telescoping tube and rod assembly, and an SMA wire interconnecting the tube and rod, in accordance with a preferred embodiment of the invention.
Figure 7A:
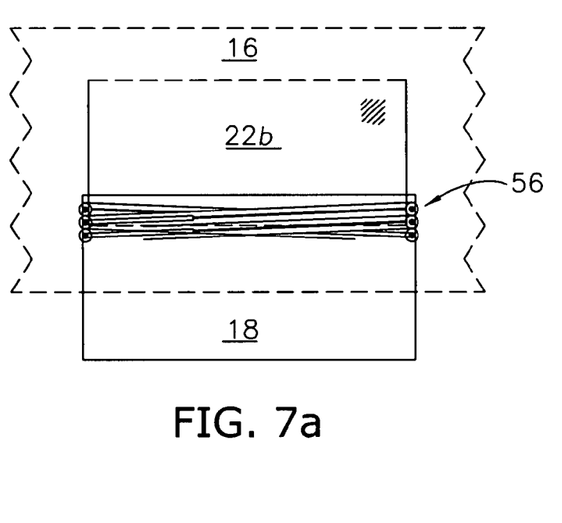
FIG. 7a is a front elevation view of the cover in an open position relative to the window, and the actuator shown in FIG. 7.

In yet another embodiment of the jack mechanism 56 shown in FIGS. 7 and 7a, the mechanism 56 comprises composite members 58b, each consisting of a tube 62 and a rod 64 tightly received within the tube 62. Each member 58b is connected to the lateral edges of the cover 18, except the lowermost member end, which is pivotably connected to the housing 16. One end of each tube 62 has a pin hole such that the tube 62 can be constrained by a pin but allowed to slide along a vertical slot defined by the housing 16; and similarly, one end of each rod 64 also has a pin hole such that the rod 64 can slide along a vertical slot defined by the housing 16. The bottom row of pins is fixed to the housing 16 and the top row of pins is fixed to the cover 18.

In this configuration, the actuator 20 includes a plurality of SMA wires 66, wherein a separate one of the wires 66 is concentrically disposed within each tube 62 and interconnects the associated rod 64 and tube 62. The wires 66 cause the rods 64 and tubes 62 to telescopingly engage, when the wires 66 are activated and deactivated. As the rods 64 are drawn into the tubes 62 the mechanism 56 is caused to longitudinally collapse (FIG. 7a). It is appreciated that only a portion of the wires 66 need to be activated in order to cause the mechanism 56 to collapse. In this configuration, the antagonistic element 40 may consist of at least one compression spring (not shown) housed within one of the tubes 62. The cover 18 is preferably attached to the uppermost point of the mechanism 56 and as a result is caused to downwardly move when the mechanism 56 is collapsed.

Advantageously, the configuration of the SMA wires 66 in FIGS. 7 and 7a presents an extensive heating net operable to melt snow or ice accumulation upon the cover 18 that may otherwise prevent retraction. As previously mentioned in this regard, overload protection is preferably provided through control logic.

Finally, it is also within the ambit of the invention for other in-plane translation configurations, including scroll embodiments, linkage, and multi-sectional sliding configurations to be utilized in actuation.

II. Exemplary In-plane Rotation Configurations

Figure 8:
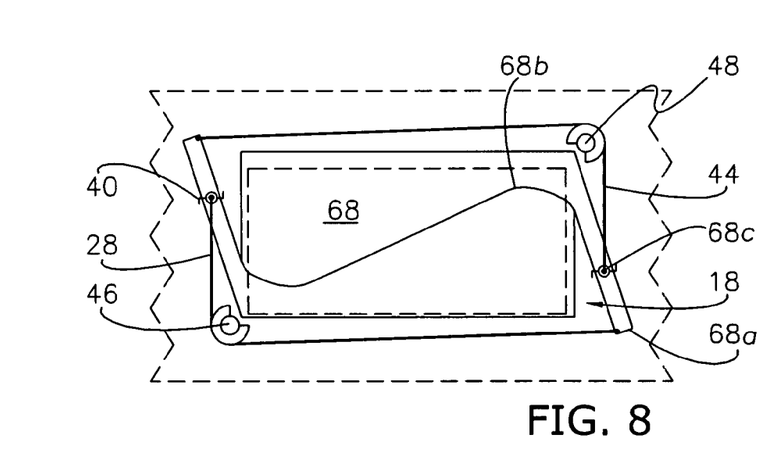
FIG. 8 is a front elevation view of a cover including first and second disks, and overlaying a window, and further including an active material actuator including first and second pulleys and associative SMA wires each interconnecting the disks, in accordance with a preferred embodiment of the invention.
Figure 8A:
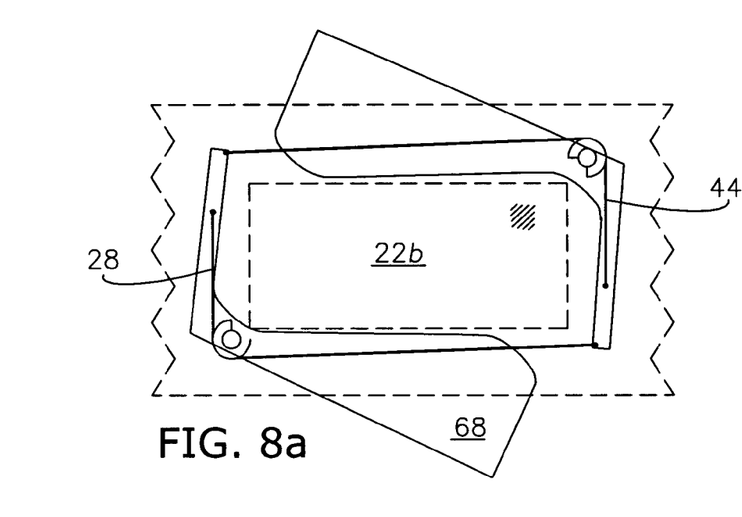
FIG. 8a is a front elevation view of the cover in an open position relative to the window, and the actuator shown in FIG. 8.

FIGS. 8 and 8a show a preferred embodiment of the system 10, wherein the cover 18 and actuator 20 are cooperatively configured to cause in-plane rotational displacement of the cover 18. More particularly, a composite cover 18 is shown including first and second mated disk 68, each having an elongated actuator engaging portion 68a and a sinuous profile 68b for facilitating engagement and rotation. It is also within the ambit of the invention, however, to use a single disk that overlays the entire window 22b, and other multi-disk configurations.

The actuator 20 includes first and second SMA wires 28,44, and first and second pulleys 46,48 rotatably connected to the housing 16 at diagonally opposite corners of the window 22b. Each of the wires 28,44 is entrained by a separate one of the pulleys 46,48 and interconnects the engaging portions 68a. More preferably, each wire is connected to a disk pivot point 68c defined along the portion 68a nearest the respective pulley, and to the end of the portion 68a of the other disk 68 (FIGS. 8 and 8a).

It is appreciated that when the wires 28,44 are thermally activated they contract causing the disks 68 to congruently rotate as shown in FIG. 8a. The disks 68, points 68b and wires 28,44 are cooperatively configured such that the window 22b is not obstructed, when the cover 18 is in the fully open position. Again, it is appreciated that the configuration of the SMA wires 28,44 will enable focused heating at the circumference of the window 22b. Again, in this regard, overload protection is preferably provided through control logic.

Finally, an antagonistic element 40 for use herein may consist of a torsion spring concentrically coupled to each disk pivot joint 68c (FIG. 8), and engaged with the housing 16 and disk 68, such that as the disks 68 are rotated towards the open position, the legs of the springs 40 are increasingly pinched creating stored energy.

III. Exemplary Out-of-plane Rotation Configurations

Figure 9A:
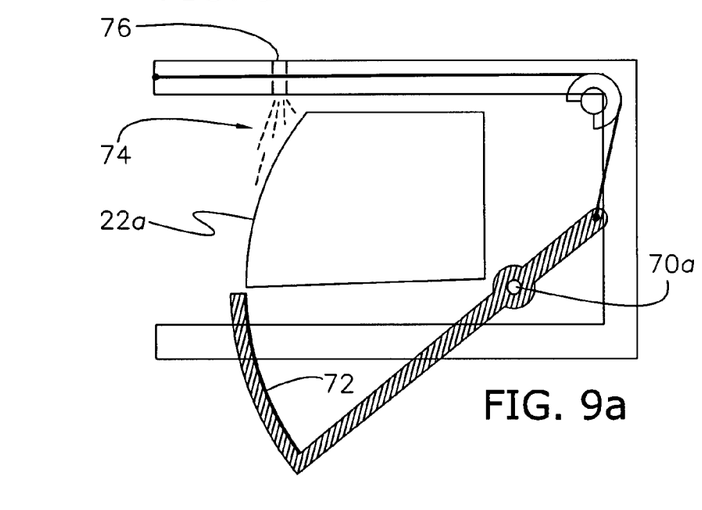
FIG. 9a is a side elevation view of the camera, housing, cover and actuator shown in FIG. 9, wherein the cover is in an open position relative to the surface.
Figure 10:
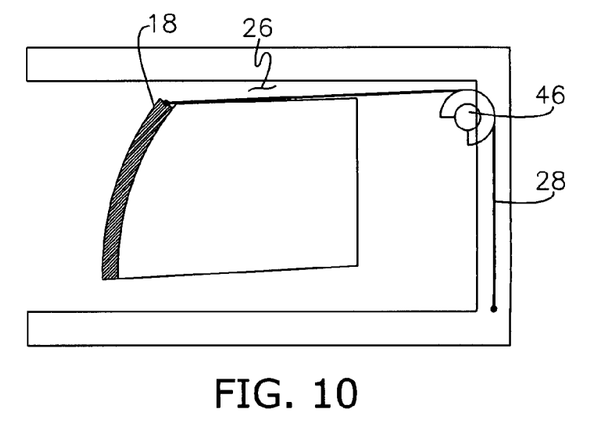
FIG. 10 is a side elevation view of a camera, camera housing, an active material cover, and an active material actuator including at least one pulley and associative SMA wire interconnecting the cover and the housing, wherein the cover overlays a surface, in accordance with a preferred embodiment of the invention.
Figure 10A:
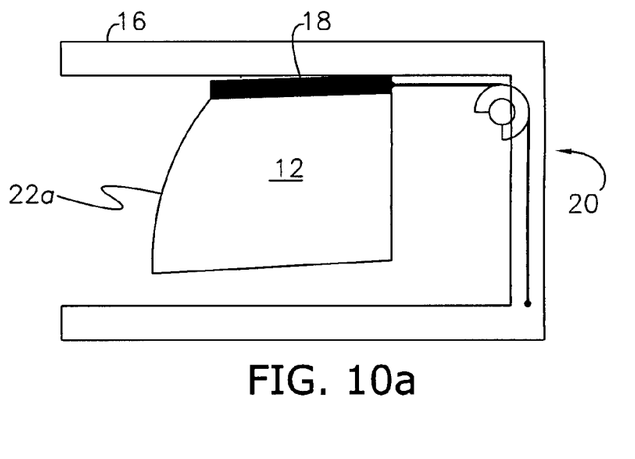
FIG. 10a is a side elevation view of the camera, housing, cover and actuator shown in FIG. 10, wherein the cover has been activated and reconfigured, so as to enter into an open position relative to the surface.

FIGS. 9 and 9a show a preferred embodiment of an out-of-plane rotational displacement system 10. In this configuration, the cover 18 is attached to at least one lever arm 70. The arm 70 is connected to the bottom of the cover 18 preferably at a first distal arm end. The cover 18 is preferably contoured to match the surface 22a of the device 12. This enables the cover 18 to form superjacent layers with, and be rotatably opened without damaging the surface 22a (compare, FIGS. 9 and 9a).

The lever arm(s) 70 defines a second free distal end spaced from the first, and a pivot point 70a, defined with the housing 16, that is preferably closer to the second end. At the second end, at least one SMA wire 28 is connected to the arm 70. The other end of the wire 28 is connected to the housing 16. A pulley 46 is rotatably connected to the housing 16 preferably directly above the second end and entrains the wire 28, so that vertical engagement is again presented. When activated, the wire 28 generates an upward force that causes the arm 70 to pivot about its pivot point 70a, and the cover 18 to open. The positioning of the point 70a relative the ends determines mechanical advantage.

In this embodiment, congruent contouring between the cover 18 and surface 22a also enables the cover 18 to be used to clean the surface 22a. To that end, a flocking layer 72 is preferably disposed along the interior surface of the cover 18, as shown FIGS. 9 and 9a. With further respect to cleaning, it is also within the ambit of the invention to apply a cleaning agent, such as windshield washer fluid 74, to the surface 22a when the cover 18 is in an open position. To that end, the housing 16 may define at least one nozzle 76 fluidly coupled, for example, to a windshield washer fluid reservoir (not shown). In this configuration, the preferred controller 42, fluid 74, and housing 16 are cooperatively configured to cause a pulse of fluid 74 to spray from the nozzle 76, only when the cover 18 is in the open position (FIG. 9a); and more preferably, to provide automatic actuation, wherein the system 10 is further configured to determine a condition requiring of cleaning (e.g., when the quality of reception/transmission is below a predetermined threshold). The cover 18 then wipes the surface 22a by traveling to the open position at least once.

In an alternative embodiment to FIG. 9, a cover 18 comprising active material, such as SMP, may be caused to translate in the upward direction, by reversing the orientation of the actuator 20 (FIG. 10). That is to say, said at least one SMA wire 28 may be fixedly attached to the housing 16 near the rear and base of the device 12, as shown in FIGS. 10 and 10a. The pulley 46 is preferably connected to the housing 16 near the rear and top of the housing 16. The other end of the wire 28 is attached to the top of the cover 18.

As illustratively depicted, the cover 18 and wire 28 are preferably activated concurrently (i.e., caused to reach their respective transition temperatures at the same time). Once activated, the cover 18 achieves a malleable state, so as to be flattened and made to enter the planar space 26 defined between the top of the device 12 and the housing 16. In a preferred embodiment, the cover 18 returns to the default protective position after device operation, as a result of deactivating the wire 28 and/or by the action of an antagonistic element 40 (not shown), and is itself deactivated, so as to re-harden to the contours of the engaging surface 22a. Advantageously, it is appreciated that this configuration provides a continuous heating net capable of melting snow or ice accumulated on the cover 18.

Figure 11:
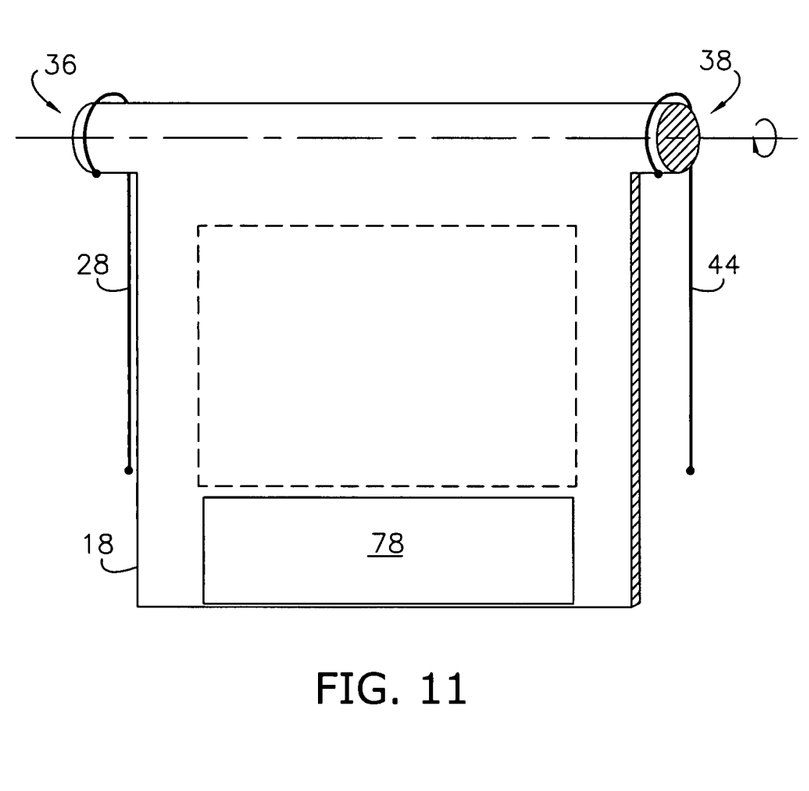
FIG. 11 is a perspective view of a cover defining a rotation axis and overlaying a window, and an active material actuator including first and second SMA wire spools wound about the axis, in accordance with a preferred embodiment of the invention.
Figure 11A:
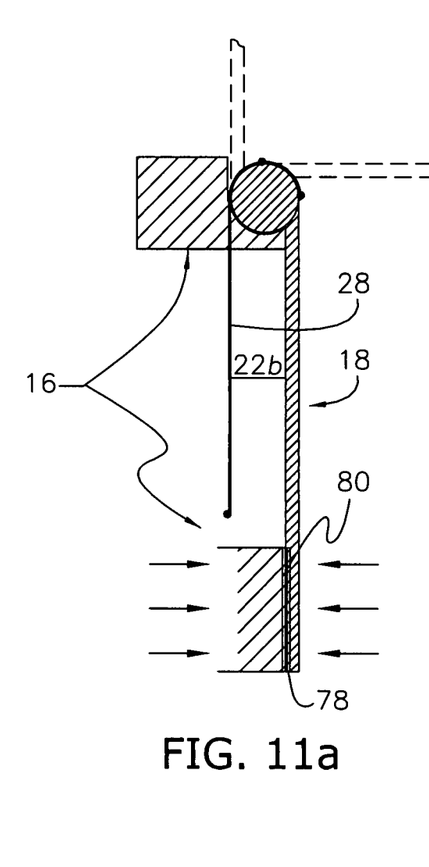
FIG. 11a is a side elevation view of the cover and actuator of FIG. 11, shown in the protective, a first open (hidden-line type), and a second open (also hidden-line type) position relative to the window, and further illustrating magnetic engagement between the cover and housing.

In another out-of-plane rotation embodiment shown in FIGS. 11 and 11a, the cover 18 presents cylindrical anchors 36,38, and the actuator 20 presents first and second SMA wires 28,44 fixedly connected to and spooled a predetermined angle about the anchors 36,38. The opposite ends of the wires 28,44 are connected to the housing 16. When activated, the wires 28,44 cause the cover 18 to rotate upwardly a predetermined angle, as shown in FIG. 11a. The total displacement required by the actuator 20 is minimized due to the small diameter of the anchors 36,38. Where a canopy effect is desired (e.g., where rain would obfuscate the surface 22a), the wires 28,44 are preferably configured to cause the cover 18 to swing upward a first angle generally equal to 95°, as shown in FIG. 11a. Otherwise, the wires 28,44 may be configured to cause the cover to swing the full 180°, as also shown in FIG. 11a. More preferably, the actuator 20 is configured to effect plural open angles, including the 95 and 180° orientations, for example, by employing SMA wires 28,38 having plural transition temperatures.

It is also within the ambit of the invention to include holding means for retaining the cover 18 in the default protective or open position. For example, the cover 18 may be configured to overlap the window 22b and further include a permanent or temporary magnet 78 attached to at least a portion of the overlapping region (FIG. 11a); and, the housing 16 further includes ferrous material 80 positioned to generate a magnetic force with the magnet 78, when the cover 18 is near the protective position. It is appreciated that the displacement force generated by the actuator 20 is substantially greater than, and more preferably 2 to 5 times greater than the holding force.

Finally, it is appreciated that other out-of-plane rotation embodiments, including active hinge configurations, rotating window configurations, wherein, for example, two windows are rotated about, so as to expose, the device 12, louver disks configurations, SMA composite configurations, and SMP hinge configurations, may also be utilized in the present invention. Moreover, appurtenances may be added to the system 10 without diverting from the scope of the present invention; for example, bearings may be added to provide rolling engagement where sliding occurs, and at least one gear may be drivenly coupled to the active material element 28, so as to save space. The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A receiver/emitter protection system adapted to protect an engaging surface defined by a vehicle from a space or window providing access to the surface, the system comprising:
    a receiver/emitter defining the engaging surface;
    a housing to enclose the engaging surface wherein the housing defines the space or window;
    a moveable cover configured to overlay the engaging surface so as to form superjacent layers with the engaging surface when the moveable cover is in a protective position;
    an engaging prong defined along a lateral centerline of the cover;
    an actuator including a thermally activated shape memory alloy (SMA) wire having a first end fixedly attached to the housing on a first side of the lateral centerline and a second end fixedly attached to the housing on a second side of the lateral centerline opposite the first side, wherein:
        the SMA wire is disposed in contact with the engaging prong to bend the SMA wire at an angle;
        the SMA wire defines a first leg and a second leg of an isosceles triangle with the engaging prong substantially at a first vertex of the triangle, and the first end and the second end of the wire are respectively at a second and third vertex of the isosceles triangle;
        a position of the second vertex and a position of the third vertex do not move when the SMA wire is activated;
        the SMA wire is operable to undergo a change in length when activated;
        the SMA wire is drivenly coupled to the cover via the engaging prong such that the cover is selectively caused to move between the protective position and an open position;
        the movement of the cover is an amplification of the change in length of the SMA wire;
        the engaging surface is exposed to the space or window as a result of the change in length of SMA wire; and
        the SMA wire is positioned relative to the cover so as to heat the cover at a predetermined location;
    an activation signal source communicatively coupled to the active material element, and operable to selectively produce an activation signal; and
    a pair of parallel slots defined in the housing to linearly guide the movement of the cover in a presence of an asymmetrical activation of the first leg relative to the second leg.

2. The system as claimed in claim 1, wherein the cover is at least partially formed of shape memory polymer, so as to become malleable when activated and then re-hardened when deactivated.

3. The system as claimed in claim 1, wherein the SMA wire is communicatively coupled to a controller, and the controller includes control logic configured to protect the SMA wire from overloading.

4. The system as claimed in claim 1, wherein the system further comprises a controller, the actuator is operable to determine a first condition where the cover fails to move and the SMA wire is activated, and the controller is communicatively coupled to the actuator and configured to modify the activation signal when the first condition is determined.

5. The system as claimed in claim 1, further comprising:
    at least one biasing element antagonistic to the actuator and configured to bias the cover towards one of the protective and open positions, wherein the at least one biasing element is disposed within at least one of the parallel slots in the housing.

6. A receiver/emitter protection system adapted to protect an engaging surface defined by a vehicle from a space or window providing access to the surface, the system comprising:
    a receiver/emitter defining the engaging surface;
    a housing to enclose the engaging surface wherein the housing defines the space or window;
    a moveable cover configured to overlay the engaging surface so as to form superjacent layers with the engaging surface when the moveable cover is in a protective position;
    an engaging prong defined along a lateral centerline of the cover;
    an actuator including an active material element having a first end fixedly attached to the housing on a first side of the lateral centerline and a second end fixedly attached to the housing on a second side of the lateral centerline opposite the first side, wherein:
        the element is disposed in contact with the engaging prong to bend the element at an angle;
        the element defines a first leg and a second leg of an isosceles triangle with the engaging prong substantially at a first vertex of the triangle;
        the first end and the second end of the active material element are respectively at a second and third vertex of the isosceles triangle;
        a position of the second vertex and a position of the third vertex do not move when the active material element is activated;
        the element is operable to undergo a change in length when activated;
        the element is drivenly coupled to the cover via the engaging prong such that the cover is selectively caused to move between the protective position and an open position;
        the movement of the cover is an amplification of the change in length of the element; and
        the engaging surface is exposed to the space or window as a result of the change in length of the element;
    an activation signal source communicatively coupled to the active material element, and operable to selectively produce an activation signal; and
    a pair of parallel slots defined in the housing to linearly guide the movement of the cover in a presence of an asymmetrical activation of the first leg relative to the second leg, wherein the active material element is selected from the group consisting of shape memory polymers, electroactive polymers (EAP), magnetostrictive materials, and electrostrictive materials.

7. The system as claimed in claim 6, wherein the actuator and cover are cooperatively configured so as to cause in-plane translation by the cover, when the active material element is activated.

* * * * *